United States Patent [19]

Granger

[11] 4,229,389

[45] Oct. 21, 1980

[54] GAS DIFFUSER, AERATOR, OR SPARGER APPARATUS

[75] Inventor: Steven T. Granger, Falls Church, Va.

[73] Assignee: Thompson Marine Corporation, Arlington, Va.

[21] Appl. No.: 21,323

[22] Filed: Mar. 16, 1979

[51] Int. Cl.² .............................................. B01F 3/04
[52] U.S. Cl. .................................... 261/122; 204/155; 210/169; 210/220; 210/223; 261/1; 261/77; 261/124
[58] Field of Search .................... 261/1, 81, 82, 87, 90, 261/122–124, 77; 164/87; 210/150, 151, 219, 220, 221 P, 222, 223, 169; 324/263; 204/155; 366/273; 148/103

[56] References Cited

U.S. PATENT DOCUMENTS

| | | | |
|---|---|---|---|
| 2,149,764 | 3/1939 | Frei | 210/223 |
| 2,678,729 | 5/1954 | Spodig | 210/222 |
| 3,080,217 | 3/1963 | Myers | 204/155 X |
| 3,186,929 | 6/1965 | Rippie | 261/1 X |
| 3,228,878 | 1/1966 | Moody | 210/222 X |
| 3,418,613 | 12/1968 | Trikilis | 324/263 X |
| 3,547,811 | 12/1970 | McWhirter | 210/220 X |
| 3,575,350 | 4/1971 | Willinger | 261/122 X |
| 3,856,513 | 12/1974 | Chen et al. | 164/87 X |
| 3,952,857 | 4/1976 | Nazuka | 210/222 X |
| 3,970,518 | 7/1976 | Giaever | 210/222 X |
| 4,007,240 | 2/1977 | Gosden | 261/122 |
| 4,026,805 | 5/1977 | Fowler | 210/223 |
| 4,118,447 | 10/1978 | Richter | 261/122 |
| 4,162,970 | 7/1979 | Zlokarnik | 210/220 X |

FOREIGN PATENT DOCUMENTS

| | | | |
|---|---|---|---|
| 1247104 | 10/1960 | France | 261/124 |
| 604063 | 6/1948 | United Kingdom | 261/124 |
| 1189888 | 4/1970 | United Kingdom | . |

OTHER PUBLICATIONS

Thewlis, J., *Encyclopaedic Dictionary of Physics*, pp. 745–751, Pergamon Press Inc., Copyright 1961.

Hawley, G. G., *The Condensed Chemical Dictionary*, Van Nostrand Reinhold Company, Eighth Edition, p. 826, Sep. 4, 1974.

Davis et al., *The Magnetic Effect*; Exposition Press, Hicksville, New York; pp. 115–117; 1975.

*Primary Examiner*—Richard L. Chiesa
*Attorney, Agent, or Firm*—Charles R. Engle

[57] ABSTRACT

Disclosed is novel apparatus and method for introducing various gasses into liquids. This as is commonly done in aerating or oxygenating liquids where growing aquatic life such as fish; instances concerning lagoon and pond treatment, absorption of oxygen in sewage or sewage -activated sludge mixture, introduction of chlorine or carbon dioxide gas into water for chemical treatment thereof. The method includes water treatment comprising the improved diffuser, aerator or sparger apparatus with the result of substantial enlargement in the known beneficial effects of such treatments; also, substantial and unexpected attendant benefit attributable to function of the diffuser apparatus. Principally the apparatus and method reduces the viscosity of water reducing the hydrogen bonding thereof at the time when presented for gas absorbtion. This when utilizing gas for aqueous liquid treatment or treatment of water with suspended pollutants.

10 Claims, 7 Drawing Figures

GAS DIFFUSER, AERATOR, OR SPARGER APPARATUS

BACKGROUND OF THE INVENTION

The invention relates to improved method and apparatus for introducing gasses for dissolution into liquid. This is when gasses are utilized in the treatment of aqueous liquid as is well-known. Generally known as diffuser, aerator, or sparger apparatus, improvement shown herein attains substantially more effective attainment of the object of various gas treatments of liquid. Apparatus of the type referred to and which is improved as shown herein is represented by U.S. Pat. Nos. 3,977,606, 4,007,240, 3,953,553, 4,093,681, 3,575,350, 4,022,854, and 3,857,910.

In addition to the gaseous treatment of liquids in pools or tanks by carbon dioxide or chlorination for example, artificial aeration is well known as means for introducing dissolved oxygen into water. Such aeration has the object of increasing the oxygen content of aqueous systems of water management. These systems are those with quality impaired stemming from use in commercial fishery operation or amateur aquaria use, the discharge of industrial waste in streams and lagoons such as by petrochemical or paper plants, the massive impairment of water quality and the pollution thereof stemming from necessary usage in municipal sewage systems.

The prior art has addressed itself to the problems of achieving effective gas dissolution in liquid essentially by the utilization of conduit-connected perforated tubing positioned under liquid. With gas introduced into the conduit the tubing is able to release the gas, the dissolution of which is desired in the liquid, as a myriad of small bubbles. Such apparatus is conventionally known as diffuser, gas aerator, or sparger apparatus. Frequently the perforated tubing portion of the apparatus is comprised of fritted glass, sintered polymer granules compressed into a gas permeable conduit for gas, or any suitable gas permeable material able to conduct and release gas into liquid forming a myriad of small bubbles therein.

Albeit the recognized utility of gas treatment and aerating means in water management, methods related thereto such as the above have not been wholly satisfactory. This is because of low efficiency in dissolution or absorption requiring high gas input requirements with much waste of the gas introduced. Biochemical oxygenation employs air as the oxygen source utilizing large quantities thereof, because of such waste, with substantial power required. This is in providing the excess quantities needed for required dissolution of oxygen in the water being treated.

The prior art has long sought to improve gas-liquid contacting techniques by means employing agitated gas-liquid columns, plate-type columns, mechanical mixing in combination with diffusers, multiple gas contact tanks in series, the use of temperature and pressure to aid gas dissolution. However there has been no system of gas transfer in water management that may be considered substantially the superior of known prior art methods such as those above.

The difficulty of efficient gas-liquor transfer in large water management systems may be appreciated, for example, by reference to small scale amateur aquaria. Here air pumps are commonly utilized to introduce air as a source of oxygen to aquaria water containing fish. The utility of the introduced oxygen is maintenance of water quality by biochemical oxidation of the nitrite content of the water stemming from considerable waste discharged by fish. Levels of 0.1 mg N/liter (ppm) represent satisfactory water condition otherwise fish will lack appetite, have closed fins, be susceptible to disease, and succumb to higher levels of nitrite concentration they cannot tolerate. It was believed at one time that the rising bubbles from artificial aeration as practised in aquaria and similar wastewater treatment systems totally dissolved as they rose in the water. However it is now known that this is untrue. Such bubbling essentially merely moves water to the surface. Most of the oxygenation in such systems occurs at the air-water interface from the exposure of the water surface to air. This represents inefficient and poor attainment of objectives in water quality management.

SUMMARY OF THE INVENTION

Briefly, in general terms, the present invention provides a new and substantially improved method and apparatus for the treatment of liquid by the addition of gas thereto. The gas may be nearly any gas such as carbon dioxide, chlorine, oxygen, or air utilized because of its oxygen content. The processes include those carbonating liquid as by using carbon dioxide, the use of chlorine gas in the chemical treatment of swimming pool water; the utilization of oxygen (or air because of containing oxygen) in nearly any process of treatment of contaminated water.

Basically the present invention includes the method of weakening the hydrogen bonding of molecules of water to reduce the viscosity thereof. This is at the location of and simultaneously with dissolving gasses therein as desired for the water treatment practised. This is done by magnetic means found to be surprisingly effective because of the believed small energy of hydrogen bonding as compared with ordinary chemical bonds. The apparatus for practising the above method substantially enlarges and improves the results of nearly all water treatment systems with which utilized. Also large reduction in the waste of such gasses added to liquids by prior art methods, although not dissolved, is an attendant benefit.

There are numerous theoretical possibilities in explanation of the discovered substantially improved results of this apparatus for wastewater treatment. In addition to lowering viscosity of aqueous systems by believed disruption of hydrogen bonds when presenting gasses for dissolution, gasses such as oxygen are paramagnetic. Also, the apparatus is arranged to provide magnetic circuits which may act upon the outer electron shells of molecules. These are the molecules of numerous suspended contaminants in the aqueous systems being treated. I do not wish to be bound by theoretical explanation but, under the most difficult conditions, use of the subject method and apparatus provides spectacular achievement in water quality and clarity.

Essentially the apparatus of the invention suitable for practising the method disclosed comprises aerator or diffusor or sparger means. This is that suitable for introducing gas into water and releasing gas therein forming a myriad of fine bubbles in the liquid. Immediately adjacent the point of release the air-lift effect of such gas causes both the gas and lifted water to pass through multiple magnet fields arranged in combination with the aerator of diffuser. Both the rising gas and the liquid are caused to intersect magnetic flux lines of magnetic circuits at right angles.

The above and other objects and advantages of the method and apparatus of this invention will become apparent from the following more detailed description when taken in conjunction with the accompanying drawings of illustrative embodiments.

DESCRIPTION OF THE PREFERRED EMBODIMENT

Figures 1, 2:
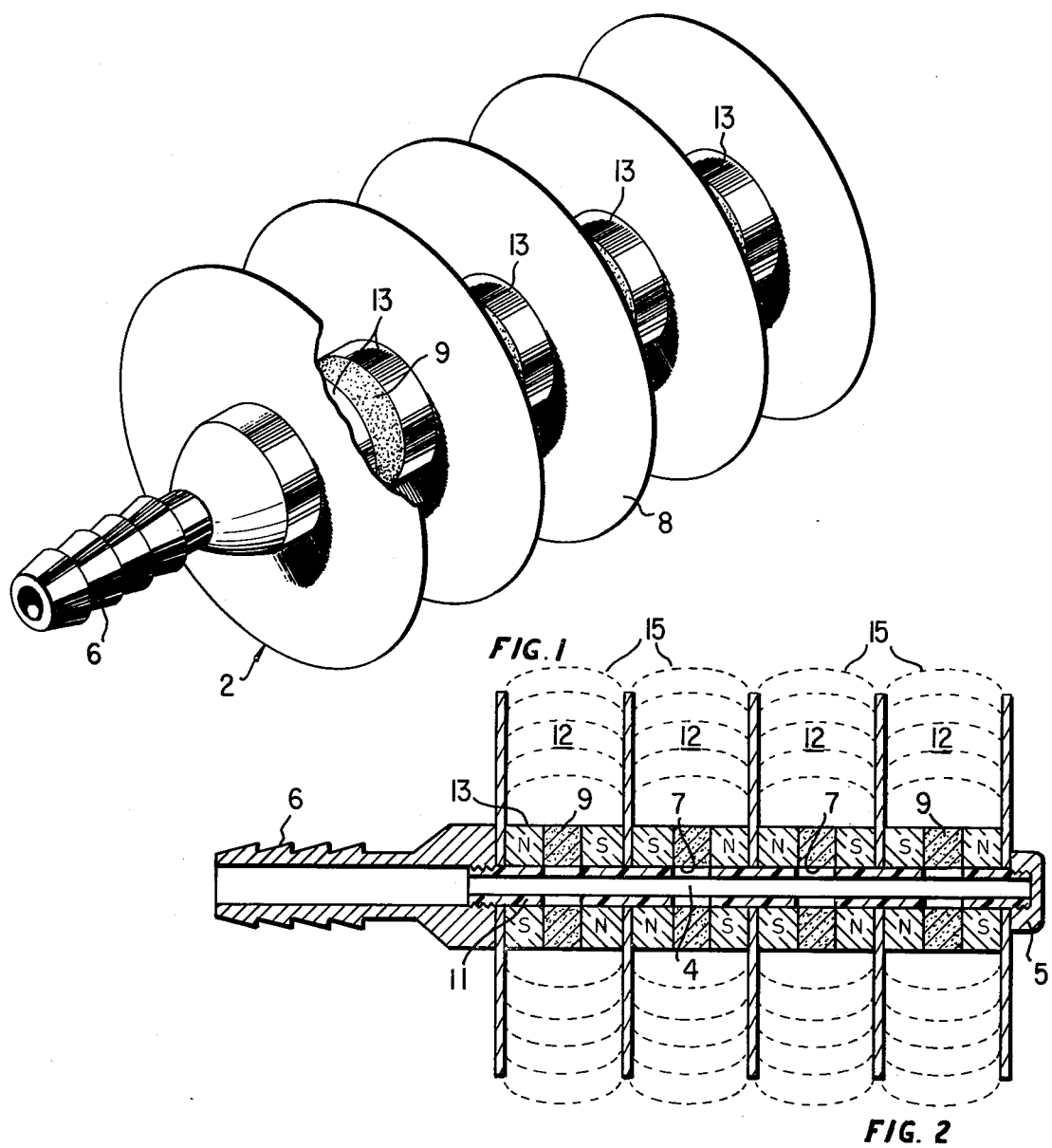
FIG. 1 is a perspective view of the improved diffuser apparatus of the present invention.
FIG. 2 is a cross-sectional view of the apparatus of FIG. 1.

Referring now to the drawings, FIGS. 1 and 2 illustrate the general construction of an improved diffuser apparatus. The diffuser apparatus 2 is shown as consisting of a first chamber 4 for the introduction of gas thereinto by a conduit that may be connected by suitable means to a inlet 6. The first gas chamber 4 is normally provided with closure means 5 of any suitable construction arranged at the chamber end opposite that of the inlet end 6. The construction of gas chamber 4 may be that of a hollow conduit with perforations located in its sidewall for the discharge of gas from its interior. Also, as is well-known, the function of conducting gas and discharging it may be provided by making the sidewalls 7 of chamber 4 of particles of plastic, glass, or other materials which are pressed together to form a unitary mass with a myriad of small passages between the particles. Arranged in this manner, gas may be conducted through such a unitary mass and discharged from the surface 9 of the gas conducting chamber. The surface of the unitary mass serves as the sidewalls of the gas conducting chamber. Alternatively, for reasons better understood as shown following, the sidewall surface may be defined by, or supported upon slotted or perforated tubular member 11 of metallic or other material suitable for conducting a magnetic circuit. When threaded at each end such a member is useful for the assembly of apparatus elements along its length as shown.

With further reference to FIGS. 1 and 2 it can be seen that flat members 8 which may be discs of non-corrosive magnetically conductive material such as magnetic grade stainless steel, galvanized iron, alloys and compositions known in the magnetic art as able to conduct magnetic fields, are spaced along the axial length of chamber 4. Chamber 4 may be arranged to extend through openings in flat members 8 defining magnetic chamber sidewalls. The flat members 8 define sidewalls of a second magnetic chamber 12 open at its lower end and in fluid communication with the perforate surface 9 of chamber 4 from which gas is discharged. Magnetic means 13 of aluminum nickle cobalt alloy, "ALNICO", barium ferrite, or amorphous metal alloy compositions such as described in U.S. Pat. No. 3,856,513, are suitably arranged in magnetively conductive relationship as shown. This is adjacent members 8 for the purpose of inducing magnetic flux lines between magnetic chamber 12 sidewall upper edges and crossing from one side to the other. As is readily apparent, molecules of gas discharged from the perforate sidewall surface 9 of chamber 4 rise upwardly in the body of liquid in which the apparatus is intended to be used. Arranged as shown both the gas, and the aqueous liquid into which gas dissolution is intended, simultaneously intersect the essentially horizontal flux lines of the magnetic circuit established at the upper portions of magnetic chambers 12. This is as the gas leaves the diffuser rising into the body of liquid being treated. Circulation of the liquid into accompanies the dissolution of gas because of air lift effect of the gas discharged into the lower portion of the liquid.

Although the induced magnetic field may be arranged in various ways in achieving the beneficial results of the invention. It is very desirable to arrange magnetic poles such as represented by the letters N and S in FIG. 2. By arranging similar or repelling poles adjacent discs or members 8 as shown, very efficient flux concentrations may be provided extending across the upper region of chambers 12.

The utilization of amorphous magnetic materials such as those of U.S. Pat No. 3,856,513 permits fabricating the sidewalls of magnetic chambers 12 of various suitable shapes. This is so that the chamber sidewalls themselves may comprise the magnetic means required by the improved apparatus of the invention. Additionally two domain magnetic structures providing like adjacent poles may be provided advantageously such as by the magnetizing method of Trikilis, U.S. Pat. No. 3,418,613.

The magnetic circuits required by the apparatus of the invention may be further enhanced by providing sidewall material for chamber 4, which sidewall extends between opposed members defining walls of chamber 12, of perforated magnetically conductive material such as magnetic grade stainless steel, gas permeable electrically conductive particles pressed into suitable shape, or other suitable means. Various arrangements of magnetic means and openings permitting discharge of gas from the chamber 4 into chamber 12 may be utilized. That shown with the perforated surface 9 for gas discharge extending between magnets 13 arranged along the length of gas chamber 4 is a preferred arrangement.

Also, the magnetic material itself may be perforated to permit the passage of gas therethrough. As is apparent to those skilled in mechanical applications many arrangements may be provided. However it is essential that the arrangement selected provide efficiently both for gas discharge and magnetic chamber magnetic flux concentration as shown. This for reason of being essential to the objects of the invention.

Figure 3:
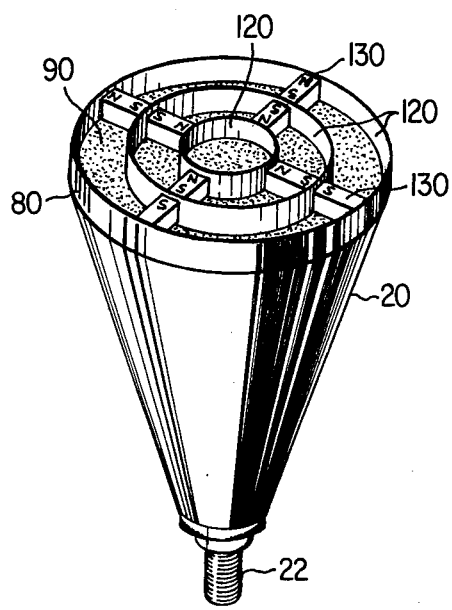
FIG. 3 is a perspective view of another embodiment of the improved diffuser apparatus of the present invention.

FIG. 3 is another embodiment 20 of the invention. Diffuser 20 differs in that it is arranged with the perforate gas outlets 90 from the interior chamber spaced vertically above inlet 22. As shown the magnetic sidewalls 80 of chambers 120 correspond to sidewalls 8 of chambers 12 of FIGS. 1 and 2. The chambers are arranged in a manner permitting the entry of gas into the lower concentric portions thereof with discharge from the top portion. Bar magnet means 130 polarized and arranged in accordance with the showings of the apparatus of FIG. 2 provide the required magnet circuit flux lines across the upper portions of magnetic chambers 120 also arranged for liquid flow thereinto from the body of liquid in which the apparatus is submerged. It is contemplated that normally the apparatus of FIGS. 1, 2, and 3 will be located in the lower portion of the bodies of liquid in which being utilized. This aids the circulation of the liquid because of the gas-lift effect of the gas discharged thereinto. An advantage of the apparatus of the embodiment of FIG. 3 is ease in connecting multiple units along the length of the upper portion of an elongate conduit (not shown) for conducting gas. This is merely by inserting threaded inlet 22 into threaded openings provided in such a conduit. This is as an aerating, for example, large bodies of liquid.

Figure 4:
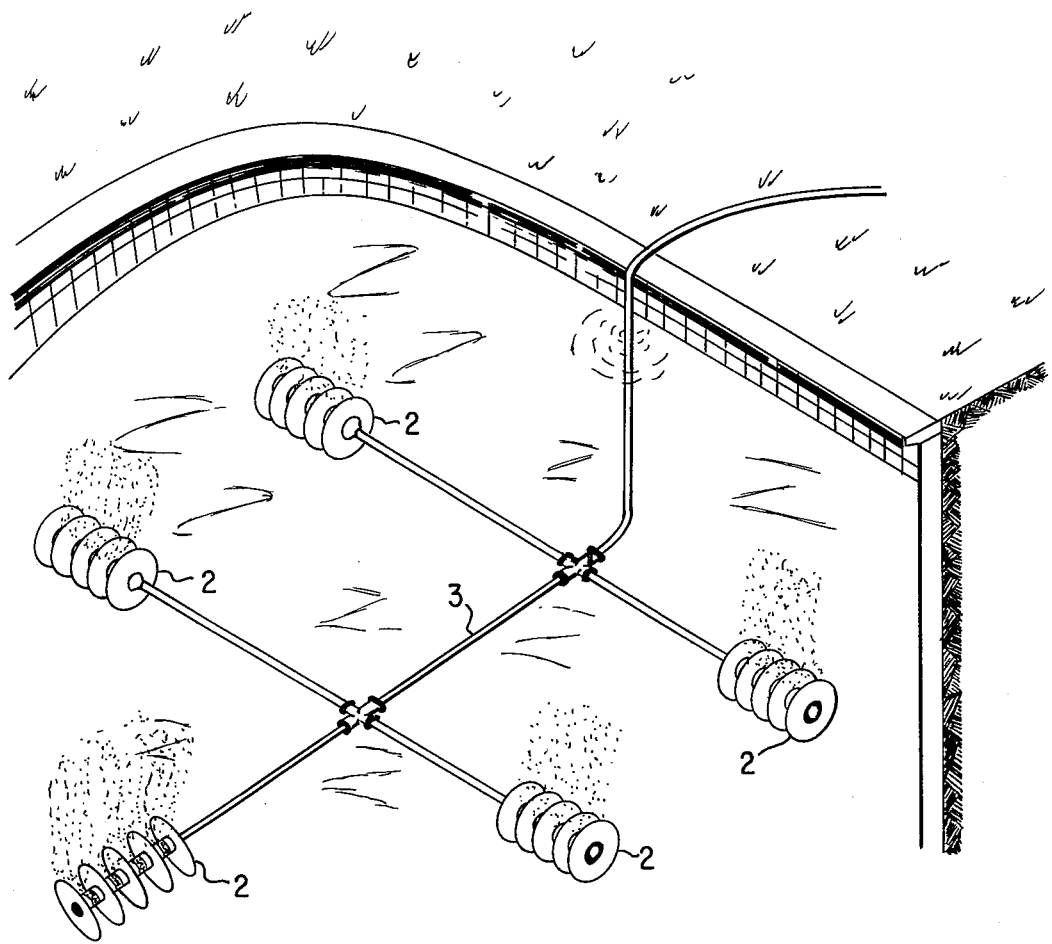
FIG. 4 is a perspective view of a method of treating liquid by the discharge of gas thereinto utilizing the improved diffuser apparatus of the present invention.

FIG. 4 is an illustrative embodiment of the method of aqueous liquid treatment such as is well known with chlorine, carbon dioxide, and similarly. Where the body of liquid is of large size multiple units may be connected to a central header 3; or, alternatively, to a length of conduit (not shown) containing the treatment gas under pressure with the conduit extended under the liquid body.

Corrosive conditions may result from certain gasses in which event consideration is properly given to the selection of materials resistant to the expected conditions stemming from the intended use of the apparatus. The selection of suitable materials for expected conditions of corrosion does not require elaboration. Additionally, the elements of the apparatus may be coated with resinous materials for the purpose of corrosion resistance by this means. Also, such coatings have the advantage of lowering the wettability of the surface of the apparatus. This is desirable when located in heavily contaminated bodies of liquid and the contaminants have tendancy to adhere to surfaces fouling openings and similarly.

Figure 5:
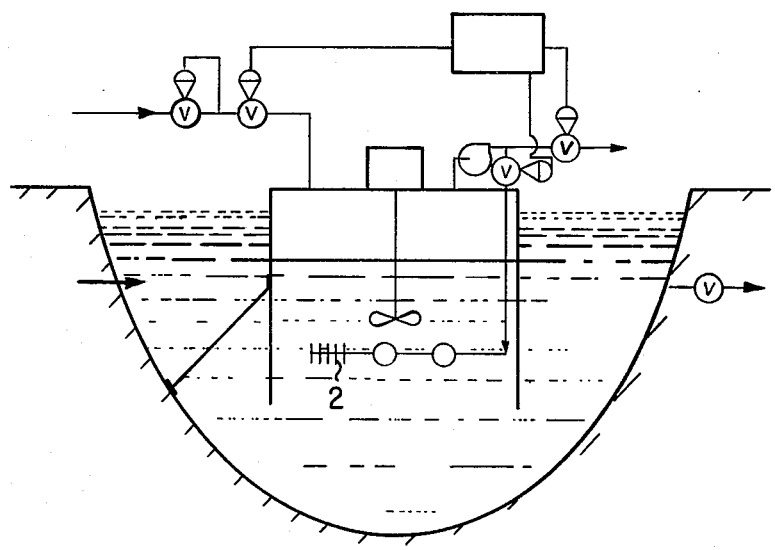
FIG. 5 is a perspective view of a method of treating, by oxygenation or aeration, sewage wastewater.

As shown in FIG. 5, the method of aeration of sewage wastewater utilizing the described apparatus entails no changes. This is in the mechanical apparatus conventionally utilized for mixing and other purposes in water treatment. This is as such mechanical means have been found to be of benefit in the past. The apparatus of the invention is merely substituted for prior art diffuser apparatus ordinarily used in combination with such prior art water treatment means. The result of utilizing the method of the invention is substantially reduced power and material requirements for the treatment of equivalent quantities of wastewater; or, alternatively, substantial improvement in the quantity of wastewater treated with the expenditure of the same or lessor amounts of power and treatment gas and material.

Figure 6:
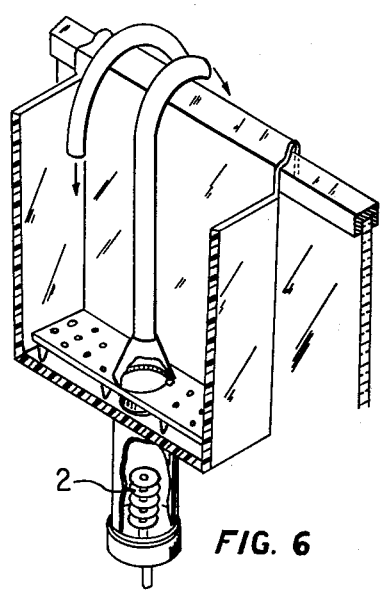
FIG. 6 is a perspective view of a method of improving the treatment of the water of recirculated systems. This is those utilizing air-lift pumping and polluted by the nitrite wastes of aquatic life such as fish.

Directing attention to FIG. 6, air-lift pumping such as that illustrated is of proven utility in both large and small water treatment installations. In small installations such as the well-known aquaria adjunct illustrated, air is introduced into the pumping leg as shown. In such cases diffuser 2 replaces the air inlet diffuser normally utilized in such applications. The substitution of the improved apparatus of this invention facilitates the pumping lift provided by this type of apparatus. This is in addition to incidental increase of the aeration of system water and beneficial treatment thereof.

Figure 7:
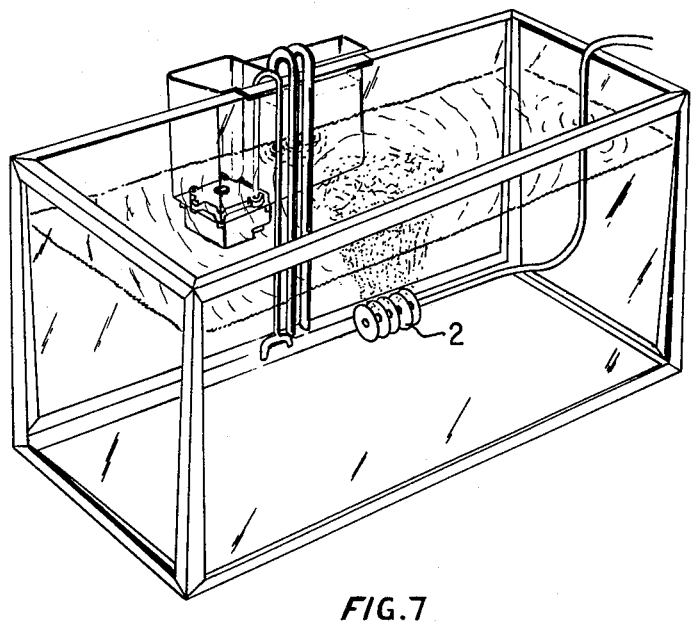
FIG. 7 is a perspective view of a method of improving the treatment of bodies of liquid. This is by utilizing the improved diffuser of the present invention as an adjunct to filter systems apparatus and other apparatus conventionally utilized in water treatment systems.

FIG. 7 illustrates the method of water treatment particularly with recirculatory systems which essentially rely upon filter apparatus and other means for water treatment. Such apparatus requires frequent attention because of problems of filter replacement and maintenance in providing a satisfactory level of water quality. Use of the method and apparatus 2 of this invention, connected to a source of aerating gas (not shown) as a separate adjunct to other system elements, provides greatly enhanced water quality overall with greatly extended periods of filter replacement and maintenance. This is in providing improved water quality in numerous systems of water management.

It is to be understood that the examples present in the foregoing specification are merely illustrative of this invention and are not intended to limit it in any manner; nor is the invention to be limited by any theory regarding its operability. The scope of the invention is to be determined by the appended claims.

I claim:

1. A diffuser for discharging gas into a body of liquid comprising, in combination, a first gas chamber, inlet means for gas in communication with the interior of said gas chamber, outlet means for gas from said chamber comprising at least one perforation located in an end wall of said chamber opposite said inlet means, a second magnetic chamber defined by spaced apart opposed sidewalls made of material magnetizable or conductive to lines of magnetic flux, magnetic means for inducing magnetic poles in said opposed sidewalls of said magnetic chamber and constructed and arranged to provide essentially horizontal magnetic flux lines across the upper portion of said magnetic chamber, the sidewalls of said magnetic chamber being constructed and arranged so that gas from said gas chamber perforation is discharged into said magnetic chamber between said sidewalls at an open bottom of said magnetic chamber and permitted to rise and leave said chamber through an open top of said magnetic chamber when said diffuser apparatus is located beneath the surface of a body of liquid, the sidewalls being further constructed and arranged to permit liquid from said liquid body to enter said magnetic chamber to replace liquid vertically lifted from said magnetic chamber and intersecting said flux lines simultaneously with the gas vertically lifing the liquid and also intersecting said magnetic flux lines.

2. The diffuser of claim 1 wherein said first gas chamber is elongate with said inlet means at a first end of said chamber and closure means arranged at the second opposite end of said chamber, the sidewall of said chamber extending between said first and second ends parallel to the elongate axis of said chamber, said at least one perforation being located in said elongate sidewall.

3. The diffuser of claim 2 wherein said first elongate chamber extends through axially located openings in the members defining said second magnetic chamber sidewalls.

4. The diffuser of claim 2 wherein the outer wall of said first gas chamber is constructed of magnetically conductive material.

5. The diffuser of claim 2 wherein a plurality of perforations in the sidewall of said gas chamber are arranged in its length between its first inlet end and opposed second closure end and a plurality of said magnetic chambers are positioned relative to said perforations so that gas from at least one perforation is discharged into the open bottom of each of said plurality of said magnetic chambers.

6. The diffuser of claim 5 wherein said second magnetic chamber sidewalls are constructed and arranged as flat members with edges extending circumferentially around the exterior surface of said first gas chamber outer wall.

7. The diffuser of claim 1 wherein said magnetic means defines said second magnetic chamber sidewalls.

8. The diffuser of claim 1 wherein said inlet means is constructed and arranged for gas conduit connection thereto.

9. The diffuser of claim 1 wherein said second magnetic chamber sidewalls are constructed of magnetic grade stainless steel.

10. The diffuser of claim 1 wherein said diffuser is arranged in plurality with the inlet of each gas chamber in communication with a common conduit therefor.

* * * * *